(12) United States Patent
Itagaki et al.

(10) Patent No.: US 8,824,080 B2
(45) Date of Patent: Sep. 2, 2014

(54) DATA RECORDING AND READING DEVICE AND METHOD

(75) Inventors: Hiroshi Itagaki, Yokohama (JP); Toshiyuki Shiratori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 13/142,831

(22) PCT Filed: Jan. 29, 2010

(86) PCT No.: PCT/JP2010/051236
§ 371 (c)(1),
(2), (4) Date: Jun. 29, 2011

(87) PCT Pub. No.: WO2010/092881
PCT Pub. Date: Aug. 19, 2010

(65) Prior Publication Data
US 2012/0014014 A1    Jan. 19, 2012

(30) Foreign Application Priority Data
Feb. 10, 2009    (JP) .................................. 2009-028428

(51) Int. Cl.
*G11B 5/09*    (2006.01)
*G06F 3/00*    (2006.01)
*G06F 5/00*    (2006.01)

(52) U.S. Cl.
USPC .............................................. 360/48; 710/52

(58) Field of Classification Search
None
See application file for complete search history.

(56) References Cited

U.S. PATENT DOCUMENTS

| 5,117,349 A * | 5/1992 | Tirfing et al. ......................... 1/1 |
| 6,792,568 B2 * | 9/2004 | Sved .............................. 714/771 |
| 7,203,844 B1 * | 4/2007 | Oxford .......................... 713/193 |

FOREIGN PATENT DOCUMENTS

| CN | 1305185 A | 7/2001 |
| EP | 0913760 A1 | 6/1999 |
| JP | 08-102141 | 4/1996 |
| JP | 08-102148 | 4/1996 |
| JP | 08-161827 | 6/1996 |
| JP | 2001-043118 | 2/2001 |
| JP | 2007095231 A | 1/2007 |
| JP | 2007-028221 | 2/2007 |
| JP | 200773108 A | 3/2007 |
| JP | 200795231 A | 4/2007 |
| JP | 2008-217860 | 9/2008 |
| WO | 2007102434 A1 | 9/2007 |

* cited by examiner

Primary Examiner — Daniell L Negron
(74) Attorney, Agent, or Firm — Griffiths & Seaton PLLC

(57) ABSTRACT

Provided is a method for recording data to a tape medium in such a manner as to achieve the easy management of mutually related multiple data pieces. First data and second data continuously received as a file from a higher level apparatus are accumulated in multiple buffer segments in the form of multiple successive data sets. A data structure is determined for each of the accumulated data sets. Management information indicating a result of the determination is added to the data sets, and the data sets and the management information thereof are stored into the tape medium.

10 Claims, 13 Drawing Sheets

DATA RECORDING AND READING DEVICE AND METHOD

CROSS-REFERENCE TO RELATED APPLICATIONS

This application is a U.S. National-Stage entry under 35 U.S.C §371 based on International Application No. PCT/JP2010/051236, filed Jan. 29, 2010, which was published under PCT Article 21(2) and which claims priority to Japanese Patent Application No. 2009-028428, filed Feb. 10, 2009.

BACKGROUND OF THE INVENTION

1. Field of the Invention

The present invention relates to an apparatus for writing data to a tape medium such as a magnetic tape, a method therefor, and the like.

2. Description of the Related Art

In tape drives that write data to a tape medium such a magnetic tape, it is common as described in Patent Documents 1 to 3 and the like that mutually related multiple data pieces are first accumulated in a buffer and then written from the buffer to the tape medium at a predetermined timing. For example, when a tape drive receives, from its higher level apparatus, a data file and a metadata file indicating the content of the data, the tape drive first accumulates these two files in a buffer and then writes them from the buffer to a tape medium at a predetermined timing.

SUMMARY OF THE INVENTION

However, the data file and the metadata file are transmitted from the higher level apparatus as two files independent of each other. Therefore, the conventional tape drive may be able to continuously store main data and sub data indicating the content or the like of the main data into the tape medium, but not be able to determine whether or not continuously stored data pieces are mutually related data pieces like the main data and the sub data. For this reason, in the process in which the tape medium storing the main data and the sub data is moved to a different system or restored in the original system, the contents or the like of the data pieces read from the tape medium need to be analyzed by an application program on the system to check the association between the main data and the sub data; otherwise, the association cannot be determined.

The present invention has been made to solve a technical problem as above, and an object thereof is to: record mutually related multiple data pieces on a tape medium in such a manner as to enable the related multiple data pieces to be stored and held always in the same location even when the tape medium is moved to a different system or restored in the original system in the future; and to make the data pieces distinguishable in the process of reading from the tape medium.

In view of the above object, a data recording apparatus of the present invention is a data recording apparatus for storing first data and second data into a tape medium, the second data related to the first data, the data recording apparatus comprising: a plurality of buffer segments in which the first data and the second data are accumulated sequentially in the form of one or more successive data sets in a predetermined size, the first and second data being continuously received as a file from a higher level apparatus; determination means that determines a data structure of each of the data sets accumulated in the buffer segments; management information adding means that adds management information to a corresponding one of the data sets, the management information indicating a determination result from the determination means; and storing control means that controls storing, into the tape medium, the data sets accumulated in the buffer segments and the management information added to the data sets.

A method therefor is a data recording method for storing first data and second data into a tape medium, the second data related to the first data, the data recording method comprising the steps of: accumulating the first data and the second data sequentially in a plurality of buffer segments in the form of one or more successive data sets in a predetermined size, the first and second data being continuously received as a file from a higher level apparatus; determining a data structure of each of the data sets accumulated in the buffer segments; adding management information to a corresponding one of the data sets, the management information indicating a result of the determination; and controlling storing, into the tape medium, the data sets accumulated in the buffer segments and the management information added to the data sets.

According to the data recording apparatus and the method therefor of the present invention, first data and second data continuously received as a file from a higher level apparatus are accumulated in buffer segments in the form of one or more successive data sets in a predetermined size, and a data structure is determined for each accumulated data set. Then, management information indicating a result of the determination is added to the data set, and the data set and the management information thereof are stored into a tape medium. Accordingly, in the data recording apparatus, the first data and the second data are recognized as the same single file, hence preventing a situation where the first data and the second data are in the future migrated to mutually different locations and stored separately. In the meanwhile, the data recording apparatus is capable of distinguishing between the first data and the second data on the basis of the management information, and therefore capable of reading only necessary information in response to a request or in its default settings.

Moreover, in the data recording apparatus, the determination means may be means that, on the basis of a predetermined request from the higher level apparatus, detects switching of data to be accumulated in one of the buffer segments and determines the data structure of a corresponding one of the data sets on the basis of a result of the detection. With this configuration, the higher level apparatus only needs to output the predetermined request to the data recording apparatus to switch the data to be accumulated to the buffer segment. This eliminates the need for changing the data structures of the first data and the second data to be outputted from the higher level apparatus to the data recording apparatus, hence bringing about an advantage that changes in software in the higher level apparatus and the like can be reduced.

Further, in the data recording apparatus, on condition that the determination means detects the switching of the data to be accumulated in the one buffer segment, invalid data may be accumulated in an empty space in the buffer segment to thereby complete the corresponding data set. With this configuration, the first data and the second data can be prevented from being mixed in a data set.

Moreover, in the data recording apparatus, the determination means may be means that determines the structure of the corresponding data set as of any one of the first data, the second data, and mixed data of the first and second data on the basis of the result of the detection of the switching of the data to be accumulated in the one buffer segment. With this configuration, the need for writing invalid data to the tape medium is eliminated, hence bringing about an advantage that the tape capacity can be saved.

Further, in the data recording apparatus, the management information may be a table for managing the data sets. With this configuration, an existing management table can be used such as a DSIT (Data Set Information Table) of the LTO standard. Hence, elements to be added to an existing configuration for implementing the present invention can be minimized.

Moreover, in the data recording apparatus, the management information adding means may be means that, on condition that any of the data sets includes both the first data and the second data, adds a data size of at least one of the first data and the second data to the management information and adds the management information to the data set. With this configuration, the data sizes of the first data and the second data constituting the data set can be checked on the basis of its management information. Hence, even in a case where the first data and the second data are mixed in a data set, necessary data can be extracted from the data set on the basis of its management information.

Moreover, in the data recording apparatus, the management information adding means may be means that acquires, from the higher level apparatus, file version data corresponding to the data sets accumulated in the buffer segments and adds the management information having the file version data to the data sets. With this configuration, multiple versions of one file can be stored collectively into the tape medium.

Further, in the data recording apparatus, the management information adding means may be means that acquires password data corresponding to the data sets accumulated in the buffer segments and adds the management information having the password data to the data sets. With this configuration, a password can be set in the management information of each data set. Hence, in reading data sets, the data sets can be read if their management information match the passwords thereof specified by the user or the like, whereas the reading of the data sets can be prohibited if the passwords do not match the management information. Accordingly, each data set can be stored into the tape medium while being separated into a part that is readable by only those knowing the password and a part that is generally readable.

Moreover, the data recording apparatus may comprise a controller that functions as the determination means, the management information adding means, and the storing control means. With this configuration, the determination means, the management information adding means, and the storing control means can be implemented by one controller, hence simplifying the configuration of the apparatus.

In view of the above object, a data reading apparatus of the present invention is a data reading apparatus for reading data on a data set basis from a tape medium that records first data and second data as a file, the second data related to the first data, the data reading apparatus comprising: reading means that reads the data sets and management information from the tape medium, the management information added to the data sets; determination means for reading that determines whether or not a data structure of each of the data sets corresponding to the read management information is of predetermined transfer target data, on the basis of the read management information; transfer means that transfers, to a transfer destination, at least one of the first data and the second data, which are determined as the transfer target data by the determination means for reading, out of data subsets constituting the data set.

A method therefor is a data reading method for reading data on a data set basis from a tape medium that records first data and second data as a file, the second data related to the first data, the data reading method comprising the steps of: reading the data sets and management information from the tape medium, the management information added to the data sets; determining whether or not a data structure of each of the data sets corresponding to the read management information is of predetermined transfer target data, on the basis of the read management information; and transferring, to a transfer destination, at least one of the first data and the second data, which are determined as the transfer target data, out of data subsets constituting the data sets.

According to the data reading apparatus and the method therefor of the present invention, data sets and management information added to the data sets are read from a tape medium, and it is determined whether or not the data structure of each of the data sets is of predetermined transfer target data, on the basis of the management information. Then, at least one of first data and second data determined as the transfer target data is transferred to a transfer destination, out of data subsets constituting the data sets. Since which data subsets in the data sets read from the tape medium are the transfer target data is determined based on the management information and the determined data subsets are transferred to the transfer destination, the transfer destination no longer needs to perform an analysis on the data content of each data set. This in turn eliminates the need for an application program or the like for performing the analysis. Moreover, since the transfer destination only needs to request data reading without concerning the association between the data subsets, processes to be performed at the transfer destination can be simplified.

Moreover, the data reading apparatus may comprise buffer segments to accumulate the data sets and the management information thereof read by the reading means, and the determination means for reading may be means that determines on the basis of the management information accumulated in the buffer segments whether or not each data subset in each of the data sets corresponding to the management information is the transfer target data. With this configuration, the data structures of the data sets read out to the buffer segments can be determined based on the management information added to the data sets. Hence, the relation between data subsets in the read successive data sets can be figured out. Accordingly, data subsets in multiple data sets can be associated with each other without a dedicated application program.

Further, the data reading apparatus of the present invention may be a data reading apparatus for reading data on a data set basis from a tape medium that records first data and second data as a file, the second data related to the first data, the data reading apparatus comprising: management information reading means that reads management information from the tape medium, the management information added to the data sets; target data determining means that determines whether or not data subsets in the data sets corresponding to the read management information are of predetermined target data, on the basis of the read management information; and data detecting means that detects a data subset located at a requested data position, on the basis of multiple data subsets determined as the target data by the target data determining means out of the data subsets constituting the data sets.

Further, a method therefor is a data reading method for reading data on a data set basis from a tape medium that records first data and second data as a file, the second data related to the first data, the data reading method comprising the steps of: reading management information from the tape medium, the management information added to the data sets; determining whether or not a data structure of each of the data sets corresponding to the read management information is of predetermined target data, on the basis of the read management information; and detecting a data subset located at a requested data position, on the basis of multiple data subsets determined as the target data out of data subsets constituting the data sets.

According to this data reading apparatus and the method therefor, management information added to data sets are read from a tape medium, and it is determined whether or not the data structure of each of the data sets is of target data, on the basis of the management information. Then, a data subset located at a requested data position is detected from among data subsets which are determined as the target data out of the data subsets constituting the data sets. Hence, from among the successive target data pieces read from the tape medium, a data subset located at a desired data position can be detected. Accordingly, a higher level apparatus no longer needs a dedicated application program for associating data subsets in multiple data sets with each other.

According to the tape drive, the data recording apparatus adds management information to each data set that includes at least one of first data and second data constituting the same one file and that is accumulated in a corresponding buffer segment, and stores the data set into a tape medium. Moreover, the data reading apparatus transfers data subsets determined as transfer target data to a transfer destination on the basis of the management information added to the data sets read from the tape medium. Accordingly, in data reading from the tape medium, the data structure of each data set can be determined, hence making it possible to distinguish between the first data and the second data constituting the same one file.

According to the present invention, mutually related multiple data pieces are recorded on a tape medium as the same one file, hence preventing a situation such as losing part of information in the related multiple data pieces during the execution of such an operation as data migration or restoration. Moreover, in data reading from the tape medium, the tape drive can distinguish between the data pieces, hence eliminating the need for using an application program on the system to analyse the contents or the like of the data pieces read from the tape medium. Accordingly, versatility can be improved for the apparatus to write data to the tape medium as well as for some other apparatus.

DETAILED DESCRIPTION OF THE DRAWINGS

Figure 1:
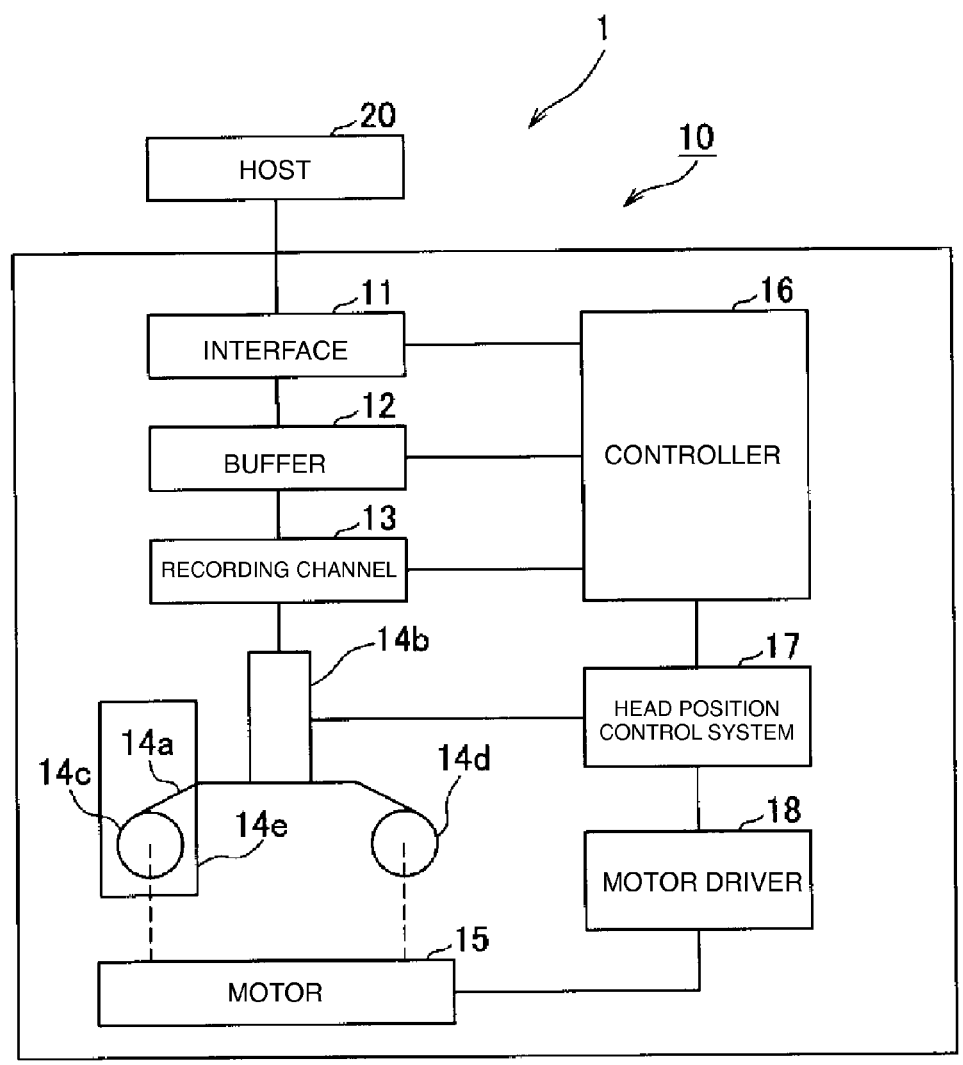
FIG. 1 is a block diagram showing an example of a schematic configuration of a tape drive of the present invention.

Hereinbelow, modes for carrying out the present invention (hereinafter, referred to as "embodiments") will be described in detail by referring to the drawings in FIGS. 1 to 13.

In FIG. 1, a tape medium recording system 1 includes a tape drive 10 and a host computer (host) 20. The tape drive 10 and the host 20 are electrically connected to each other.

Figure 2:
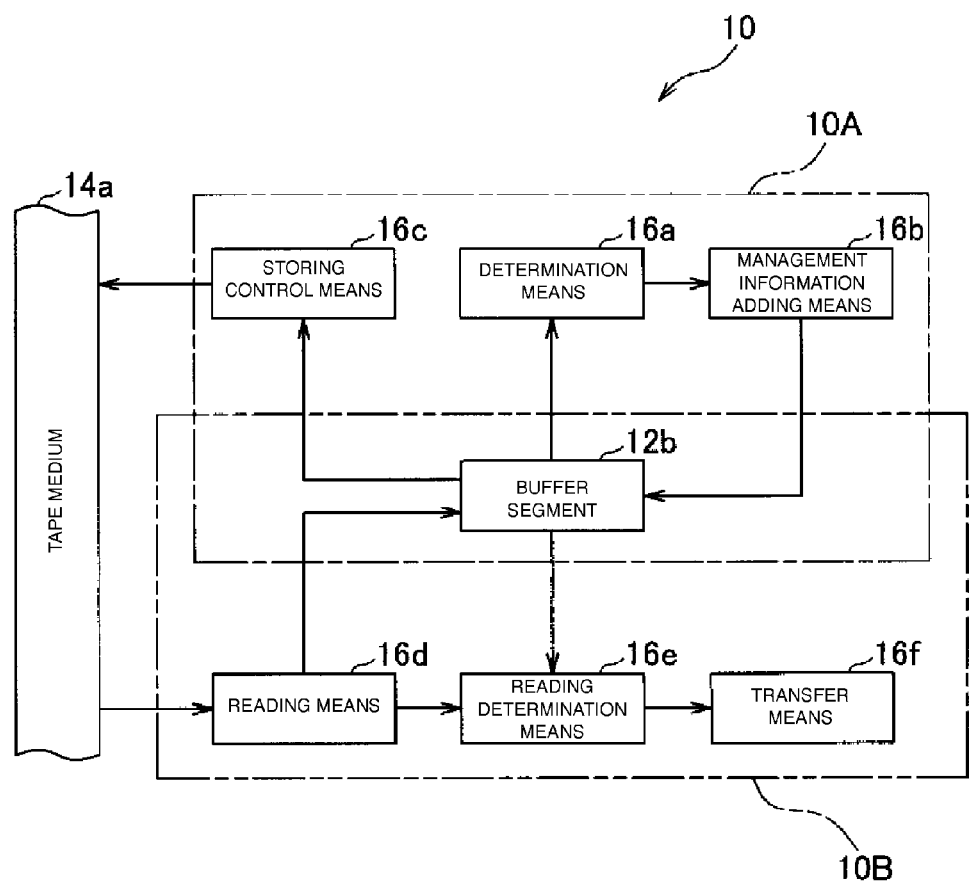
FIG. 2 is a configuration diagram showing basic configurations of a data recording apparatus, a data reading apparatus, the tape drive, and the like of the prevent invention.

The tape drive 10 corresponds to a data recording apparatus 10A and a data reading apparatus 10B shown in FIG. 2. The tape drive 10 includes an interface 11, a buffer 12, a recording channel 13, a tape medium (hereinafter, also referred to as tape) 14a, a head 14b, reels 14c and 14d, a cartridge 14e, a motor 15, a head position control system 17, and a motor driver 18.

The interface 11 communicates with the host 20. For example, the interface 11 receives a command that instructs the writing of data to the buffer 12 and a command that instructs the writing of data from the buffer 12 to the tape 14a. Incidentally, SCSI (Small Computer System Interface) is illustrated as the communication standard used by the interface 11. In the case of the SCSI, the former command corresponds to a Write command. Moreover, for the latter command (synchronization command), a Write File Mark (Write FM) command can be used. The interface 11 returns a response to the host 20 as to whether processes corresponding to these commands have succeeded or failed.

Figure 3:
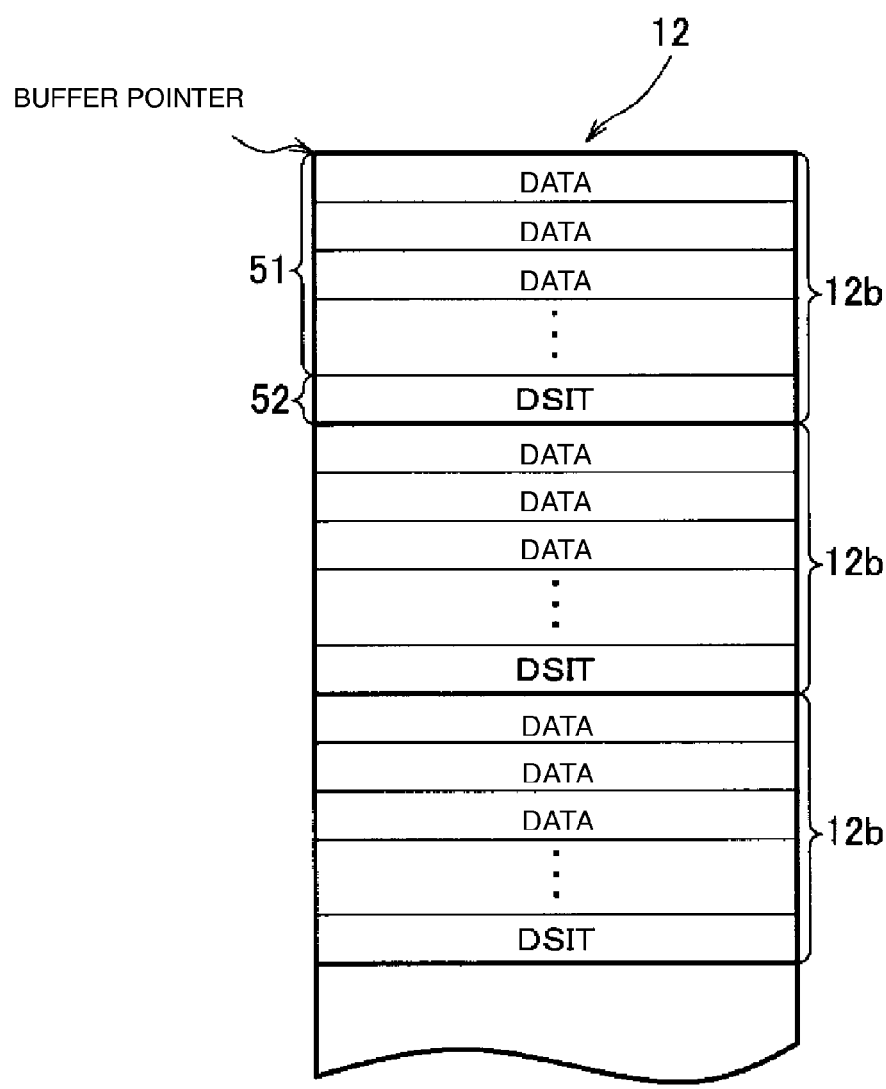
FIG. 3 is a diagram for describing the relationship between a buffer in FIG. 1 and each data set therein.

The buffer 12 is a memory to accumulate data from the host 20 which is to be written to the tape 14a. For example, the buffer 12 is formed of a DRAM (Dynamic Random Access Memory). In addition, the buffer 12 includes multiple buffer segments (hereinafter, also referred to as segments) 12b as shown in FIG. 3. Each segment 12b stores a data set 51 which is a predetermined unit based on which reading and writing are performed on the tape 14a.

As described, in this embodiment, the description will be given by illustrating the LTO (Linear Tape-Open) standard. Terms are based on the LTO standard as well. For example, a set of data stored in one segment of the buffer 12 is defined as a "data set." The segments 12b accumulate (store) multiple, various types of data from the host 20 in the form of successive data sets 51.

The recording channel 13 is a communication path used to write the data set 51 accumulated in each segment 12b of the buffer 12 to the tape 14a.

The tape 14a is a tape medium serving as data storing means. Each data set 51 passed through the recording channel 13 is written to the tape 14a by the head 14b. Moreover, the tape 14a is wound around the reels 14c and 14d and moved selectively in any one of a direction from the reel 14c to the reel 14d and a direction from the reel 14d to the reel 14c along with their rotations. The cartridge 14e is a container to house the reel 14c having the tape 14a wound therearound, but may be provided to house the reel 14d instead.

The motor 15 rotates the reels 14c and 14d. Note that while the motor 15 is depicted by one rectangle figure in FIG. 1, it is preferable to provide in total two motors 15, one to the reel 14c and the other one to the reel 14d.

The controller 16 controls the whole tape drive 10. For example, the controller 16 controls the writing of a data set 51 to the tape 14a in accordance with a Write FM command or the like received at the interface 11. The controller 16 also controls the head position control system 17 and the motor driver 18. By executing programs such as microcodes, the controller 16 functions as determination means 16a, management information adding means 16b, and storing control means 16c of the data recording apparatus 10A as well as reading means 16d, determination means for reading 16e, and transfer means 16f of the data reading apparatus 10B, which are shown in FIG. 2.

The head position control system 17 is a system to trace one or more of desired wraps. Here, the "wrap" refers to a group of multiple tracks on the tape 14a. As the need for switching the wrap arises, the need for electrically switching the head 14b arises as well. Such switching is controlled by the head position control system 17.

The motor driver 18 drives the motor 15. Note that two motor drivers 18 are provided if two motors 15 are to be used as mentioned above. Moreover, for the sake of simple illustration, the motor driver 18 herein is connected to the controller 16 via the head position control system 17, but may be connected directly to the controller 16.

Figure 4:
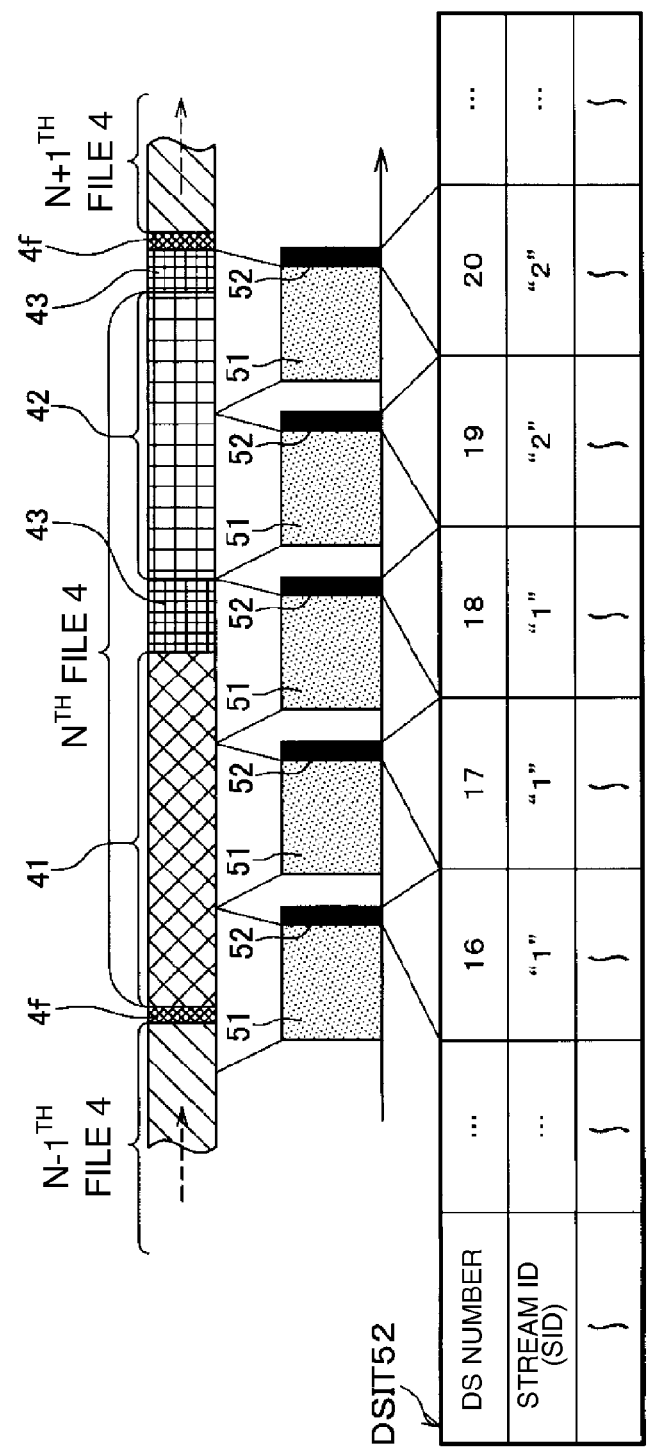
FIG. 4 is a diagram for describing an example of the relationship between the data set and its DSIT.

Next, for the host 20, a server computer or the like is used. The host 20 performs data transfer with the tape drive 10. The host 20 uses the tape drive 10 for the purpose of backing up programs, various types of data, etc. and for some other purposes. In a case of requesting the writing of file data to the tape 14a, the host 20 transmits a Write command to the tape drive 10 together with data pieces obtained by dividing that file data 4 into pieces in a predetermined size that is smaller than the data set 51, as shown in FIGS. 3 and 4. Note that pieces of the file data 4 can have a size larger than the data set 51, or any respective sizes.

Moreover, the host 20 transmits a Read command to the tape drive 10 in a case of reading data from the tape 14a. In this embodiment, the description will be given based on a case where a Mode Select command (hereinafter, also referred to as MS command) of the SCSI is used as means for giving the tape drive 10 designation of a stream ID (hereinafter, also referred to as SID) according to the present invention. However, a dedicated command may be newly provided. In one example of the SID, "1" is defined as Default (main data) while "2" is defined as sub data. Note that the host 20 is not limited to a computer; various electronic devices are available such for example as an audio device and a household electric device.

Next, referring to the drawings in FIG. 4 and the like, description will be given of an example of the relationship between user data to be stored into the tape 14a and data sets 51 thereof in the above-mentioned tape medium recording system 1.

In FIG. 4, in a case of sending multiple files 4 as a series of user data to the tape drive 10, the host 20 inserts a symbol called a file mark 4f between each pair of successive multiple files 4. In this way, it is possible to recognize the boundary between the multiple files 4. The $N^{th}$ file 4 shown in FIG. 4 includes main data 41 and sub data 42 which correspond respectively to the first data and the second data found in the claims. Here, N represents an integer.

The main data 41 may be any data such for example as video, music, or document. The sub data 42 is data related to the main data 41 and can be metadata, for example. When no sub data 42 is associated with the main data 41, the file 4 can be formed solely of the main data 41 like the $N-1^{th}$ file 4. In this embodiment, the description will be given based on a case where a single file 4 is formed of the main data 41 and the sub data 42.

Note that the main data 41 and the sub data 42 are applicable to various different embodiments. For example, as one embodiment, in a database, the main data 41 may serve as information on departments or the like while the sub data 42 may serve as personal information or the like related thereto, and these data pieces are backed up by the above-mentioned tape drive 10.

The successive multiple files 4 with the file marks 4f interposed therebetween are each divided in accordance with the transfer size. Then, each data set 51 is set to any data size such for example as 0x200000 bites in accordance with the sizes of the buffer 12, the segment 12b, and the like.

Each data set 51 is created as any one of: main data 41; main data 41 with invalid data 43; sub data 42; and sub data 42 with invalid data 43. In this embodiment, if the end of main data 41 or sub data 42 in a file 4 is located in a middle of a data set 51, a region following the end is padded with invalid data 43. Instead of padding, various different configurations are employable such for example as inserting delimiter data and continuously accumulating the next data after the end. Moreover, an empty string or the like can be used as the invalid data. In this embodiment, the description will be given based on a case where the data size of the data set 51 is smaller than the data size of each of the multiple files 4. However, the data set 51 can have any data size.

Each of the multiple data sets 51 has a DSIT (Data Set Information Table) 52 added thereto as a management table. The DSIT 52 has a data structure showing the data sequential number of the data set 51, the number of records in the data set 51, and the like, as used in the LTO standard. In addition, in this embodiment, a new field is added to the DSIT 52. This new DSIT 52 functions as the management information found in the claims.

The DSIT 52 includes the SID added to the new field. In the DSIT 52, the SID is set selectively at either "1" or "2" in accordance with the data type or the like of the corresponding data set 51. In this embodiment, the value of the SID is changed in response to the aforementioned MS command from the host 20. Instead of this, various different configurations are employable such as the host 20 using a command to specify the changed value of the SID. Moreover, the SID can be a type of data such as for example as a flag or a character as long as it can select between main data 41 and sub data 42. Also, various different embodiments are employable such as storing the DSIT 52 in association with the corresponding data set 51 but in a separate region in the buffer 12.

The DSITs 52 are created when user data from the host 20 is divided into data sets 51. Each DSIT 52 is added to the corresponding data set 51 and stored into the corresponding segment 12b of the buffer 12. Instead of this, various different embodiments are employable such as storing the DSIT 52 in association with the corresponding data set 51 but in a separate region in the buffer 12.

Note that the management information according to the present invention can be implemented by adding it to the data set 51 or the DSIT 52 as a new form of information different from the DSIT 52 such a flag. However, using the existing DSIT 52 as in the case of this embodiment brings about an advantage that changes in the tape drive 10 and application programs thereof can be reduced.

Next, description will be given of each means that operates when the controller 16 of the above-mentioned tape drive 10 functions as the data recording apparatus 10A and the data reading apparatus 10B shown in FIG. 2.

To function as the data recording apparatus 10A, the controller 16 executes a given program to function as the determination means 16*a*, the management information adding means 16*b*, and the storing control means 16*c* shown in FIG. 2.

The determination means 16*a* determines whether the data structure of a data set 51 accumulated in a segment 12*b* is of main data 41 or sub data 42. In this embodiment, the determination means 16*a* determines the data structure of the data set 51 by referring to the value of the SID in the aforementioned memory or the like, the value being switched in response to a request from the host 20. For example, the determination means 16*a* determines the data structure as of main data 41 if the SID is set at "1." On the other hand, the determination means 16*a* determines the data structure as of sub data 42 if the SID is set at "2." Note that the determination means 16*a* can determine the data structure by checking the data type with the host 20 or analyzing the data content. Moreover, as another embodiment, in addition to the determination as to whether the data structure is purely of main data 41 or sub data 42, the determination means 16*a* may determine whether or not the data structure is of mixed data of main data 41 and sub data 42.

The management information adding means 16*b* adds a DSIT (management information) 52 indicating the result of the determination of the determination means 16*a* to a corresponding data set 51. The management information adding means 16*b* of this embodiment creates a DSIT 52 including the value of the SID in the memory or the like, adds the DSIT 52 to a corresponding data set 51, and stores the DSIT 52 into a corresponding segment 12*b*.

The storing control means 16*c* controls the storing, into the tape 14*a*, of the data set 51 and the DSIT 52 added to the data set 51, both of which are accumulated in the segment 12*b*. To write the data set 51 and the DSIT 52 in the buffer 12 to the tape 14*a*, the storing control means 16*c* of this embodiment controls the recording channel 13, the head position control system 17, the motor driver 18, and the like.

To function as the data reading apparatus 10B, the controller 16 executes a given program to function as the reading means 16*d*, the determination means for reading 16*e*, and transfer means 16*f* shown in FIG. 2.

The reading means 16*d* controls the recording channel 13, the head position control system 17, the motor driver 18, and the like to thereby read pairs of data sets 51 and DSITs 52 added to the data sets 51 from the tape 14*a* and sequentially accumulate the pairs in segments 12*b*, respectively.

The determination means for reading 16*e* determines whether or not the data subsets in the data sets 51 corresponding to the respective read DSITs 52 are predetermined transfer target data, on the basis of the SIDs and the like in the read DSITs 52. In a case where the transfer target data is main data 41, the determination means for reading 16*e* of this embodiment determines whether or not the SIDs in the DSITs 52 are set at "1." On the other hand, in a case where the transfer target data is sub data 42, the determination means for reading 16*e* determines whether or not the SIDs in the DSITs 52 are set at "2."

Of the data subsets constituting the data sets 51 accumulated in the segments 12*b*, the transfer means 16*f* transfers at least one of the main data 41 and the sub data 42 determined as the transfer target data by the determination means for reading 16*e*, to the host 20 being the transfer destination via the interface 11. Specifically, if the transfer target data is the main data 41, the transfer means 16*f* transfers the main data 41 in the multiple data sets 51 to the host 20. Moreover, if the transfer target data is both the main data 41 and the sub data 42, the transfer means 16*f* transfers the main data 41 in the multiple data sets 51 as well as the sub data 42 continuous to the main data 41, to the host 20 in association with each other.

Next, referring to the drawings in FIGS. 5 to 7 and the like, description will be given of an example of various processes according to the present invention, which are executed by the controller 16 of the above-mentioned tape drive 10. First, referring to a flowchart shown in FIG. 5, description will be given below of an example of a Write command process which the controller 16 executes when the tape drive 10 receives Write commands from the host 20.

The controller 16 writes data received together with the Write commands to segments 12*b* from a position indicated by a pointer of the buffer 12 (S111). The controller 16 then determines whether or not one or more data sets 51 are completed as a result of writing the data to the segments 12*b* (S112). If determining that one or more data sets 51 have not been completed (NO in S112), the controller 16 proceeds to a process in step S115. On the other hand, if determining that one or more data sets 51 have been completed (YES in S112), the controller 16 proceeds to a process in step S113.

In the process in step S113, the controller 16 determines the data structure of each of the data sets 51 by determining whether or not the value set to the SID in the memory or the like indicates main data 41. Then, the controller 16 creates DSITs 52 indicating the determination results, i.e., DSITs 52 including the SIDs, and thereafter proceeds to a process in step S144.

In the process in step S114, the controller 16 controls the recording channel 13, the head position control system 17, the motor driver 18, and the like in order to write the data sets 51 and the DSITs 52 in the segments 12*b* to the tape 14*a* via the recording channel 13. Thereafter, the controller 16 proceeds to the process in step S115.

In the process in step S115, the controller 16 advances the buffer pointer of the buffer 12 to the end of the data written to the buffer 12, and then ends the process. The above-mentioned process is described while assuming that the data set 51 including the end of the data sent together with the Write commands is usually incomplete. Note, however, that if the end of the data is exactly at the end of the data set 51, the controller 16 advances the buffer pointer of the buffer 12 to the next segment 12*b*.

Figure 5:
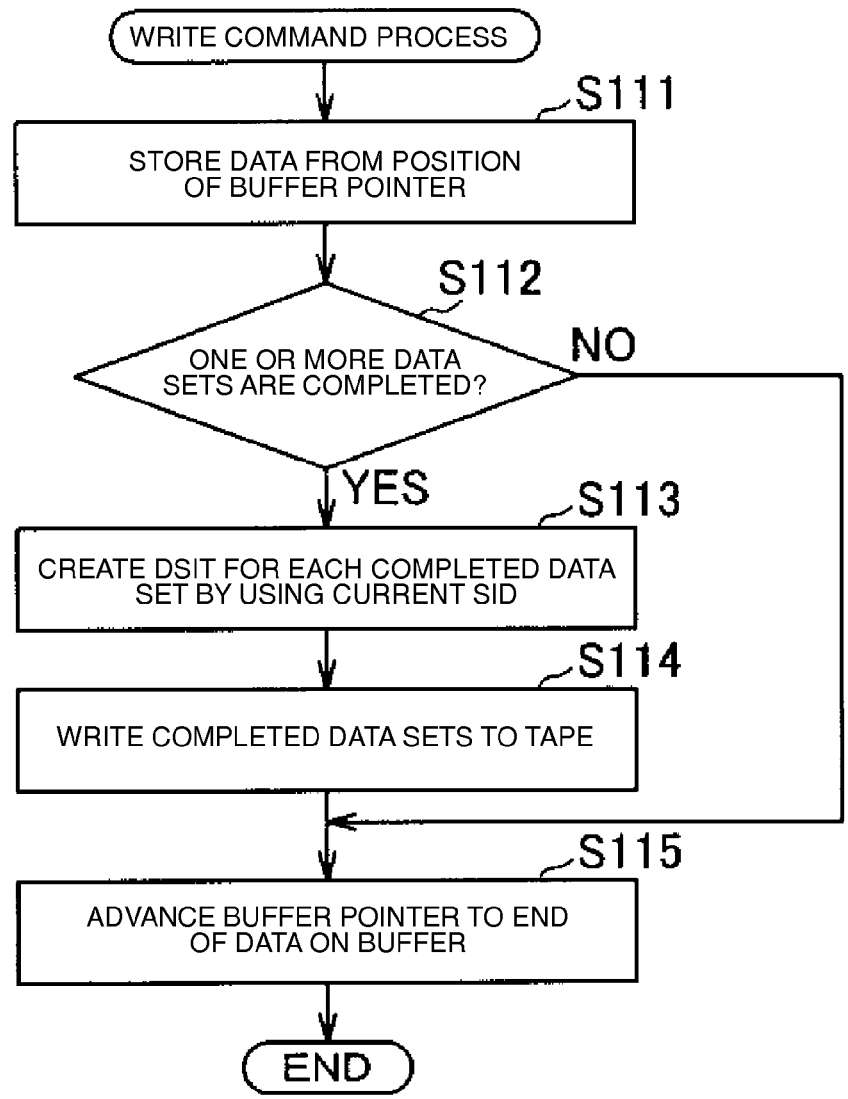
FIG. 5 is a flowchart showing an example of a Write command process according to the present invention, which is executed by a controller in FIG. 1.

By executing the above-described Write command process shown in FIG. 5, the controller 16 functions as the determination means 16*a*, the management information adding means 16*b*, and the storing control means 16*c* of the data recording apparatus 10A found in the claims. Specifically, step S113 in the flowchart shown in FIG. 5 corresponds to the determination means 16*a* and the management information adding means 16*b*, and step S114 corresponds to the storing control means 16*c*.

Next, referring to a flowchart shown in FIG. 6, description will be given below of an example of a Sync process executed by the tape drive 10. This Sync process is a process called in a Mode Select command process to be described later. Note that the Sync process can be started by a Write FM command.

In a process in step S121, the controller 16 checks the position of the buffer pointer of the buffer 12 and then proceeds to a process in step S122. In step S122, the controller 16 determines whether there is data remaining in an incomplete segment 12b in which the buffer pointer is located, i.e., whether the buffer pointer is set at the beginning of the next segment 12b. If determining that there is no data remaining (NO in S122), the controller 16 ends the process. On the other hand, if determining that there is data remaining (YES in S122), the controller 16 proceeds to a process in step S123.

In the process in step S123, the controller 16 uses invalid data 43 to pad a region following the end of the data written to the segment 12b at this time, i.e., a writable region in the segment 12b. Thereafter, the controller 16 proceeds to a process in step S124.

In the process in step S124, the controller 16 determines the data structure of the corresponding data set 51 by determining whether or not the value set to the SID in the memory or the like indicates main data 41. Then, the controller 16 creates a DSIT 52 indicating the determination result, i.e., a DSIT 52 including the current SID, and thereafter proceeds to a process in step S125. The DSIT 52 created by this process is formed of the main data 41 and the invalid data 43. Moreover, the DSIT 52 indicates by the SID that the data set 51 is formed of the main data 41.

In the process in step S125, the controller 16 controls the recording channel 13, the head position control system 17, the motor driver 18, and the like in order to write the data set 51 and the DSIT 52 in the segment 12b to the tape 14a via the recording channel 13. Thereafter, the controller 16 proceeds to a process in step S126. In step S126, the controller 16 advances the buffer pointer of the buffer 12 to the beginning of the next segment 12b, and then ends the process.

Figure 6:
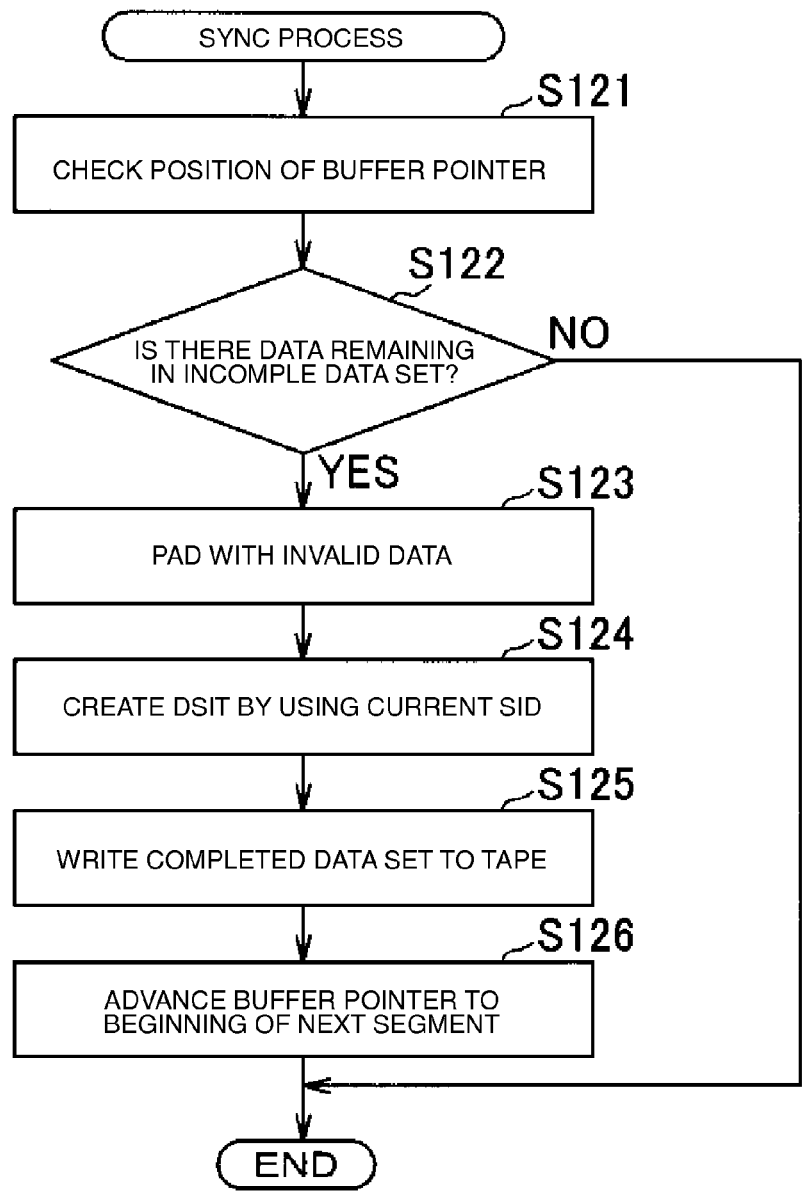
FIG. 6 is a flowchart showing an example of a Sync process according to the present invention, which is executed by the controller in FIG. 1.
Figure 7:
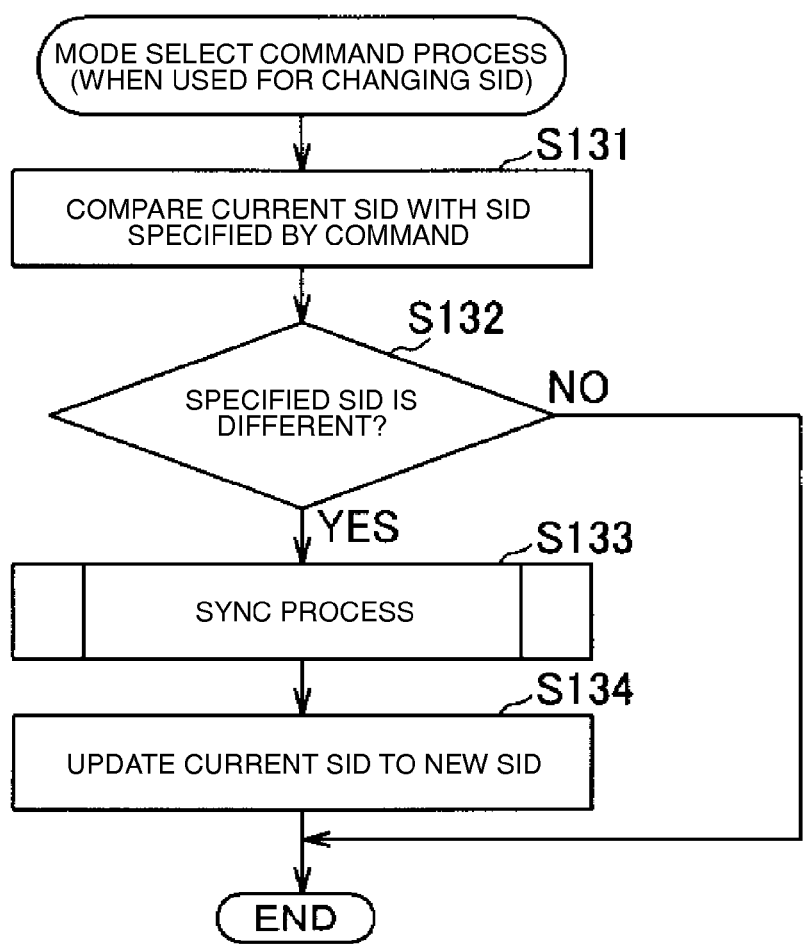
FIG. 7 is a flowchart showing an example of a Mode Select command process according to the present invention, which is executed by the controller in FIG. 1.

By executing the above-described Sync process shown in FIG. 6, the controller 16 functions as the management information adding means 16b and the storing control means 16c of the data recording apparatus 10A found in the claims. Specifically, step S124 in the flowchart shown in FIG. 6 corresponds to the management information adding means 16b, and step S125 corresponds to the storing control means 16c.

Next, referring to a flowchart shown in FIG. 7, description will be given below of an example of the aforementioned Mode Select command process which the controller 16 executes when the tape drive 10 receives a MS command from the host 20.

In a process in step S131, the controller 16 compares the current SID in the memory or the like with a SID specified by the MS command, and then proceeds to a process in step S132. In the process in step S132, the controller 16 determines whether or not the SID specified by the MS command is different from the SID in the memory or the like. If determining that the specified SID is not different, i.e., the SIDs match each other (NO in S132), the controller 16 ends the process since the SID in the memory or the like requires no change. On the other hand, if determining that the SIDs are different from each other (YES in S132), the controller 16 proceeds to a process in step S133.

In the process in step S133, the controller 16 calls the above-mentioned Sync process shown in FIG. 6. After ending the Sync process, the controller 16 proceeds to a process in step S134. In the process in step S134, the controller 16 updates the current SID stored in the memory or the like to the SID specified by the MS command, and then ends the process.

Next, referring to the drawing in FIG. 8, description will be given below of an example of a data reading process according to the present invention, which is executed by the controller 16 of the above-mentioned tape drive 10. This data reading process assumes that it is executed when the controller 16 receives a Read command from the host 20.

First, the controller 16 acquires a Read command from the host 20 via the interface 11 (S201). Then, the controller 16 sequentially reads data sets 51 and DSITs 52 thereof from the tape 14a via the recording channel 13, and sequentially stores them into segments 12b of the buffer 12 (S202). Thereafter, the controller 16 proceeds to a process in step S203.

The controller 16 compares the DS number of each DSIT 52 with the DS number of its subsequent DSIT 52 to check whether the data sets 51 are read in the correct sequence; in addition to this, the controller 16 determines whether or not the data subsets in the data sets 51 are transfer target data requested by the Read command, on the basis of the SIDs in the DSITs 52 (step S203). Specifically, the controller 16 determines whether or not the data subsets in the data sets 51 are the transfer target data, on the basis of the transfer target data specified by the Read command from the host 20 (e.g., whether SID="1" or "2," etc.). Meanwhile, as the method for requesting the transfer target data, various different embodiments are employable such as storing the transfer target data in the internal memory or the like in advance.

The controller 16 transfers the data subsets in the data sets 51 determined as the transfer target data to the host 20 via the interface 11 in the sequence based on the DS numbers. After completing all the transfer operations (step S204), the controller 16 ends the process.

Figure 8:
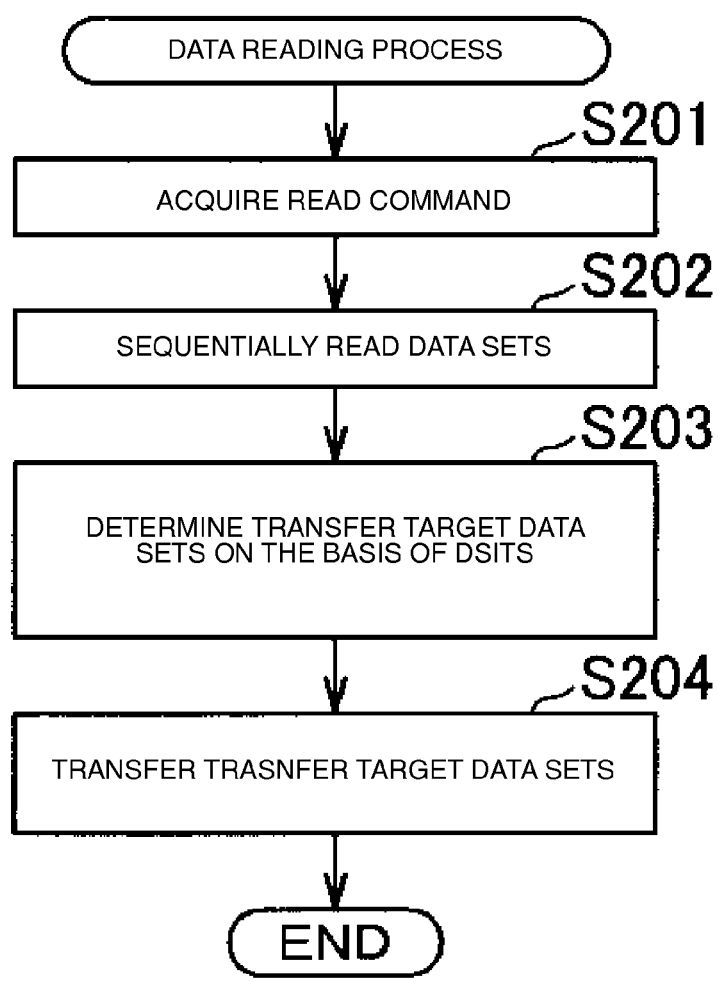
FIG. 8 is a flowchart showing an example of a data reading process according to the present invention, which is executed by the controller in FIG. 1.

By executing the above-described data reading process shown in FIG. 8, the controller 16 functions as the reading means 16d, the determination means for reading 16e, and the transfer means 16f of the data reading apparatus 10B found in the claims. Specifically, step S202 in the flowchart shown in FIG. 8 corresponds to the reading means 16d, step S203 corresponds to the determination means for reading 16e, and step S204 corresponds to the transfer means 16f.

Next, referring to the drawing in FIG. 4, description will be given below of an example of operations (effects) performed between the tape drive 10 and the host 20 in the above-mentioned tape medium recording system 1.

[Writing of Data] In a case of, for example, backing up multiple files 4 in the tape 14a, the host 20 inserts a file mark 4f between each pair of multiple successive files 4, divides each of those successive data pieces in the aforementioned predetermined size, and transmits the divided pieces sequentially to the tape drive 10 together with a Write command and a Write FM command. Then, the host 20 transmits a Write FM command for requesting the synchronization process to the tape drive 10 at a predetermined timing.

Upon receiving the first Write command, the tape drive 10 sets the SID in the internal memory or the like to "1" which is an initial value. Then, after receiving multiple Write commands, the tape drive 10 completes a data set 51 in a segment 12b of the buffer 12 and determines the data structure of the data set 51 on the basis of the SID in the internal memory or the like. The tape drive 10 creates a DSIT 52 indicating the determination result and adds the DSIT 52 to the data set 51. If receiving a Write FM request, the tape drive 10 controls the recording channel 13, the head position control system 17, the motor driver 18, and the like to thereby start storing the data set 51 and the DSIT 52 into the tape 14a.

Thereafter, the tape drive 10 iterates a series of the above-mentioned processes, so that each time a data set 51 is completed, the data structure thereof is determined, a DSIT 52 indicating the determination result is created, and the DSIT 52 is added. The tape drive 10 then stores the data set 51 and the DSIT 52 added to the data set 51 into the tape 14a.

Upon receiving a Write command for data lying across the N-1$^{th}$ file 4 and the N$^{th}$ file 4 as shown in FIG. 4, the tape drive 10 first completes a data set 51 thereof in a segment 12b of the buffer 12, and then determines the data structure of the data set 51 on the basis of the SID in the internal memory or the like. Since the SID is "1," the tape drive 10 determines that the data structure of the data set 51 is of main data 41, and creates a DSIT 52 indicating the determination result.

For example, as shown in FIG. 4, in a DSIT 52 in which a sequential number of "16" is set to the DS number, "1" is set to the SID. A data set 51 thereof then has a structure including the N-1$^{th}$ main data 41 and the N$^{th}$ main data 41 as well as the file mark 4f therebetween. In a DSIT 52 with a DS number of "17," "1" is set to the SID. A data set 51 thereof is formed solely of the N$^{th}$ main data 41.

Thereafter, upon detecting the end of the main data 41 in the N$^{th}$ file 4, i.e., detecting the boundary between the main data 41 and its accompanying sub data 42, the host 20 transmits data corresponding to the end of the main data 41 and a Write command to the tape drive 10. Then, the host 20 transmits a MS command to the tape drive 10 for changing the SID from "1" to "2."

Upon receiving the Write command, the tape drive 10 stores the data into a segment 12b of the buffer 12. In this event, if receiving a MS command, the tape drive 10 pads the current accumulation-target segment 12b with invalid data 43 to thereby complete a data set 51 therein. Once creating a DSIT 52 corresponding to the data set 51 and adding the DSIT 52 thereto, the tape drive 10 changes the SID in the memory or the like from "1" to "2." The DS number and the SID of the completed DSIT 52 of this case are "18" and "1," respectively.

Next, the host 20 transmits data obtained by dividing the sub data 42 in the N$^{th}$ file 4 to the tape drive 10 together with a Write command. On the other hand, upon receiving the Write command, the tape drive 10 completes a corresponding data set 51 in a segment 12b of the buffer 12, and then determines the data structure of the data set 51 on the basis of the SID in the internal memory or the like. Since the SID is "2," the tape drive 10 determines that the data structure of the data set 51 is of the sub data 42, and creates a DSIT 52 indicating the determination result. The tape drive 10 adds the DSIT 52 in which "2" is set to the SID to the data set 51.

Thereafter, upon detecting the end of the sub data 42, i.e., detecting the boundary between the N$^{th}$ file 4 and another file mark 4f, the host 20 transmits a Write command and corresponding data to the tape drive 10 and then transmits a MS command to the tape drive 10 for changing the SID from "2" to "1."

In response to the Write command, the tape drive 10 stores the data into a segment 12b of the buffer 12. Upon receiving the MS command from the host 20 when the corresponding data set 51 is incomplete, the tape drive 10 pads the current accumulation-target segment 12b with invalid data 43 to thereby complete the data set 51. After determining on the basis of the SID in the internal memory or the like that the data structure of the data set 51 is of the sub data 42, the tape drive 10 creates a DSIT 52 indicating the determination result and adds the DSIT 52 to the data set 51. Thereafter, the tape drive 10 changes the SID in the memory or the like from "2" to "1."

Subsequently, upon receiving a Write command from the host 20, the tape drive 10 completes a corresponding data set 51. Since the SID in the internal memory or the like is set at "1," the tape drive 10 determines that the data structure of the data set 51 is of main data 41. The tape drive 10 creates a DSIT 52 indicating the determination result (SID="1") and adds the DSIT 52 to the data set 51. Thereafter, the tape drive 10 iterates a series of the above-mentioned processes, so that the data structure of each following data set 51 is determined on the basis of the SID in the internal memory or the like, a DSIT 52 indicating the determination result is created, and the DSIT 52 is added to the data set 51.

[Reading of Data] In a case of reading desired data from the tape 14a, the host 20 transmits a Read command that specifies, for example, the DS number range, the SID, and the like to the tape drive 10. Here, the description will be given of a case where only main data 41 is to be read. Note that the Read command does not necessarily have to specify the DS numbers and the like.

Upon receiving the Read command from the host 20, the tape drive 10 sequentially reads data sets 51 and their management information 52 from the tape 14a and sequentially stores them into segments 12b of the buffer 12. Meanwhile, in this embodiment, if the Read command does not specify the SID, the tape drive 10 assumes data corresponding to a predetermined default value (e.g., "1" in a case of main data 41) as the transfer target data.

If the data sets 51 are read in the correct sequence based on the DS numbers in the management information, the tape drive 10 determines whether or not the data sets 51 are the transfer target data requested by the Read command, on the basis of the SIDs in the management information. Then, the tape drive 10 sequentially transfers only main data 41, which is the transfer target data, to the host 20 via the interface 11. On the other hand, the host 20 sequentially stores the main data 41 received from the tape drive 10 into a memory, a hard disk drive, or the like.

Next, in a case of reading only sub data 42 from the tape 14a, the host 20 transmits a Read command that specifies, for example, the SID and the like to the tape drive 10. Then, the tape drive 10 sequentially reads data sets 51 and their management information 52 from the tape 14a and sequentially stores them into segments 12b of the buffer 12. If the data sets 51 are read in the correct sequence based on the DS numbers in the management information, the tape drive 10 determines the data structure of each of the successive data sets 51 on the basis of the SID in the corresponding management information. Then, the tape drive 10 transfers only sub data 42, which is the transfer target data, to the host 20 via the interface 11. On the other hand, the host 20 sequentially stores the sub data 42 received from the tape drive 10 into a memory, a hard disk drive, or the like.

According to the tape drive 10 described above, main data (first data) 41 and sub data (second data) 42 continuously received as a file from the host 20 are accumulated in multiple segments 12b in the form of multiple successive data sets 51, and a data structure is determined for each of the accumulated data sets 51. Then, a DSIT (management information) 52 indicating the determination result is added to a corresponding one of the data sets 51, and the data sets 51 and the DSITs 52 are stored into the tape 14a. Thus, although the mutually related data pieces are treated as a single file in the tape drive 10, the adding of the DSIT 52 to each of the multiple data sets 51 stored in the tape 14a makes it possible to, in reading the data sets 51 or doing the like, distinguish between the main data 41 and the sub data 42 by checking the data structure of each data set 51 on the basis of the DSIT 52 added to the data set 51.

Also, according to the tape drive 10, data sets 51 and DSITs 52 added to the data sets 51 are read from the tape 14a, and it is determined based on the DSITs whether or not the data sets 51 are the transfer target data. Then, of data subsets constituting the data sets 51, at least one of main data 41 and sub data 42 determined as the transfer target data is transferred to the host 20 being the transfer destination. Since which data subsets in the data sets 51 read from the tape 14a are the transfer target data is determined based on the DSITs 52 and the determined subsets are transferred to the host 20 being the transfer destination, the host 20 no longer needs to perform an analysis on the data content of each data set 51. This in turn eliminates the need for an application program or the like for performing the analysis. Moreover, since the host 20 being the transfer destination only needs to request data reading without concerning the association between the data subsets, processes to be performed at the transfer destination can be simplified.

Therefore, according to the present invention, main data 41 and sub data 42, i.e., mutually related multiple data pieces are recorded to the tape 14a as the same one file, hence preventing a situation such as losing part of information in the related multiple data pieces during the execution of such an operation as data migration or restoration. Moreover, in data reading from the tape 14a, the tape drive 10 can distinguish between data pieces (in this embodiment, main data 41 and sub data 42), hence eliminating the need for using an application program on the system to analyse the contents or the like of the data pieces read from the tape 14a. Accordingly, versatility can be improved for the apparatus to write data to the tape 14a as well as for some other apparatus.

In the above-mentioned embodiment, the description has been given of the case where main data 41 and sub data 42 are made distinguishable by adding only SIDs to DSITs 52 serving as the management information. Note, however, that the present invention is not limited thereto, and some other type of data can be added.

The $N^{th}$ file 4 shown in FIG. 4 mentioned above has been described based on the case where the host 20 makes it impossible for the main data 41 and the sub data 42 to be in the same data set 51. Instead of this, it is possible to employ an embodiment in which the main data 41 and the sub data 42 are mixed in a data set 51.

Figure 9:
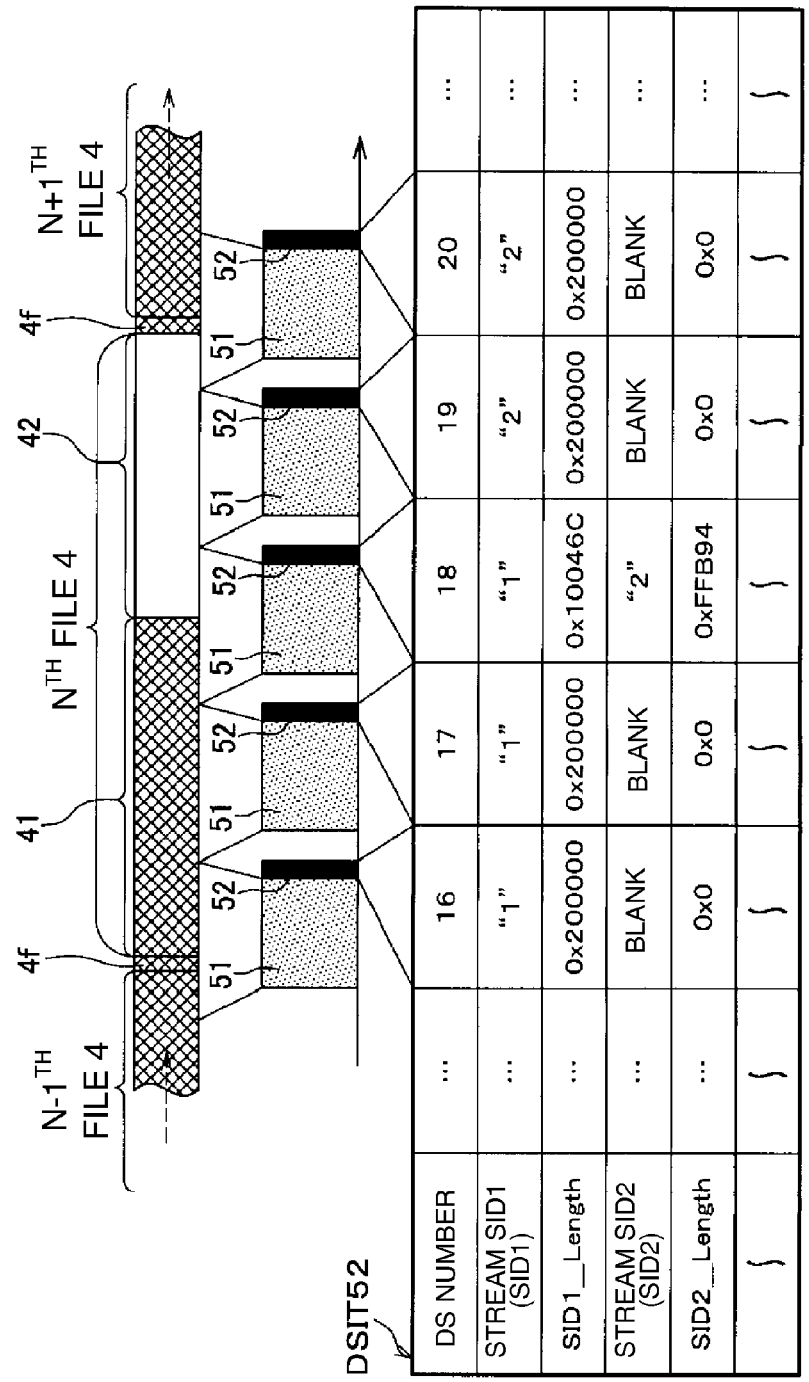
FIG. 9 is a diagram for describing another example of the relationship between the data set and its DSIT.

For example, as shown in FIG. 9, each DSIT 52 may include various types of data such as the aforementioned DS number, SID1, SID1_Length, SID2, and SID2_Length. The SID1 indicates the first or the only one type of data in the data set 51. That is, by being set at "1" or "2" as mentioned above, the SID1 indicates that a data subset(s) appearing first in the data set 51 or each data subset constituting the data set 51 is the main data 41 or the sub data 42.

To the SID1_Length, the length of the data of the SID1 is set. A fixed length of 0x200000 is set when only one type of data is stored, whereas the data length of the first data located at the beginning is set when different types (two types) are mixed. The SID2 is data indicating whether or not the data set 51 is formed of two types of data. A blank is set to the SID2 when the data set 51 is formed of only one type of data, whereas the second type of data in the data set 51 is set to the SID2 when the data set 51 is formed of two types of data. To the SID2_Length, the length of the second data indicated by the SID2 is set.

By providing the SID1_Length and the SID2_Length as described, it is possible to check the data size of each of main data 41 and sub data 42 constituting a data set 51 on the basis of its DSIT 52. Accordingly, even when main data 41 and sub data 42 are mixed in a data set 51, necessary data can be extracted from the data set 51 on the basis of its DSIT 52.

Next, referring to the drawings in FIGS. 10 to 13, description will be given of an example of various processes according to the present invention, which are executed by the controller 16 of the above-mentioned tape drive 10 for setting data sizes in the DSIT 52.

Figure 10:
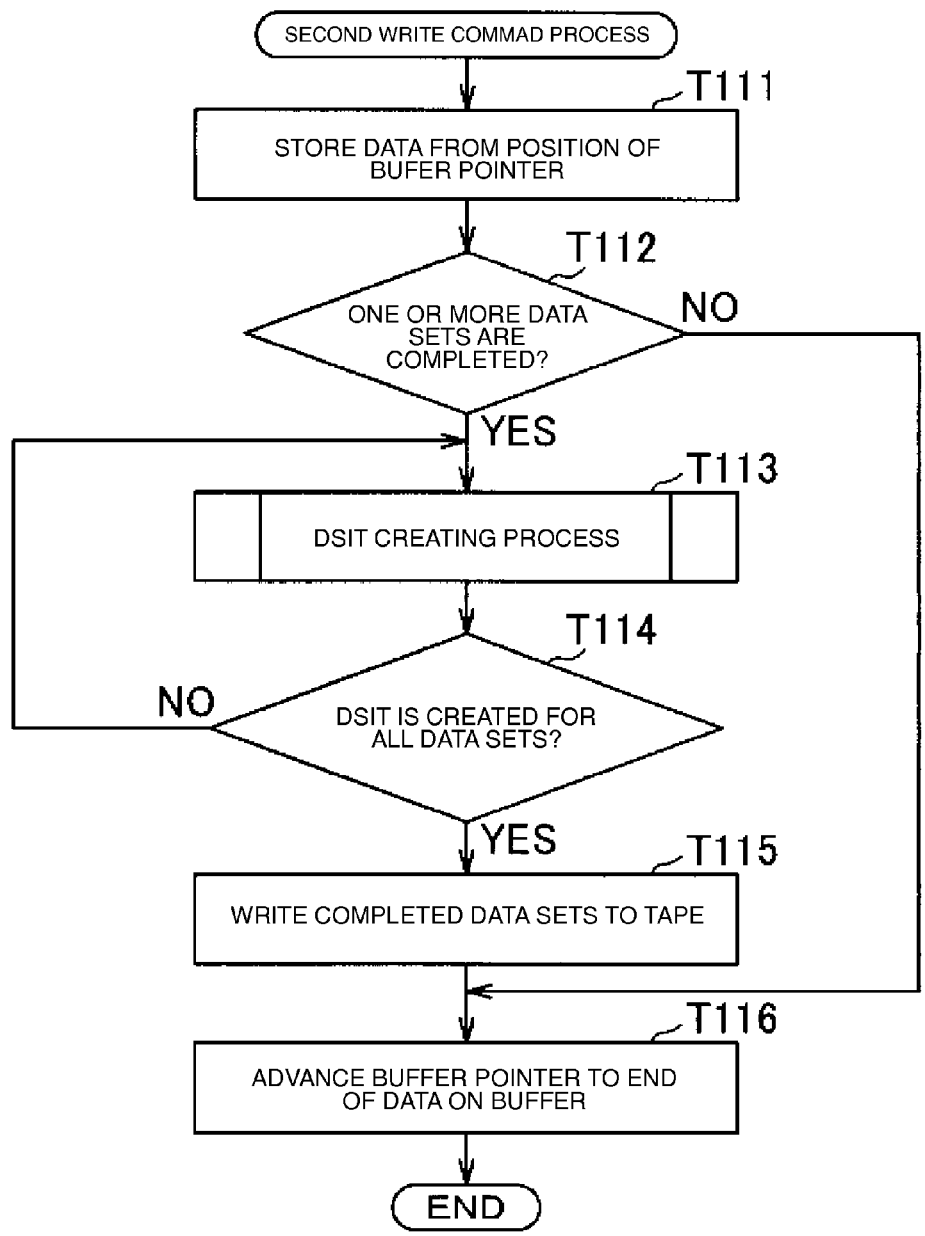
FIG. 10 is a flowchart showing an example of a second Write command process according to the present invention, which is executed by the controller in FIG. 1.

First, referring to the drawing in FIG. 10, description will be given below of an example of a second Write command process executed by the controller 16 of the above-mentioned tape drive 10. Note that this second Write command process is the same as the above-mentioned Write command process shown in FIG. 5 in their basis parts.

The controller 16 writes data received together with Write commands to segments 12b from a position indicated by the pointer of the buffer 12 (T111). The controller 16 then determines whether or not one or more data sets 51 are completed as a result of writing the data to the segments 12b (T112). If determining that one or more data sets 51 have not been completed (NO in T112), the controller 16 proceeds to a process in step T116. On the other hand, if determining that one or more data sets 51 have been completed (YES in T112), the controller 16 proceeds to a process in step T113.

Figure 11:
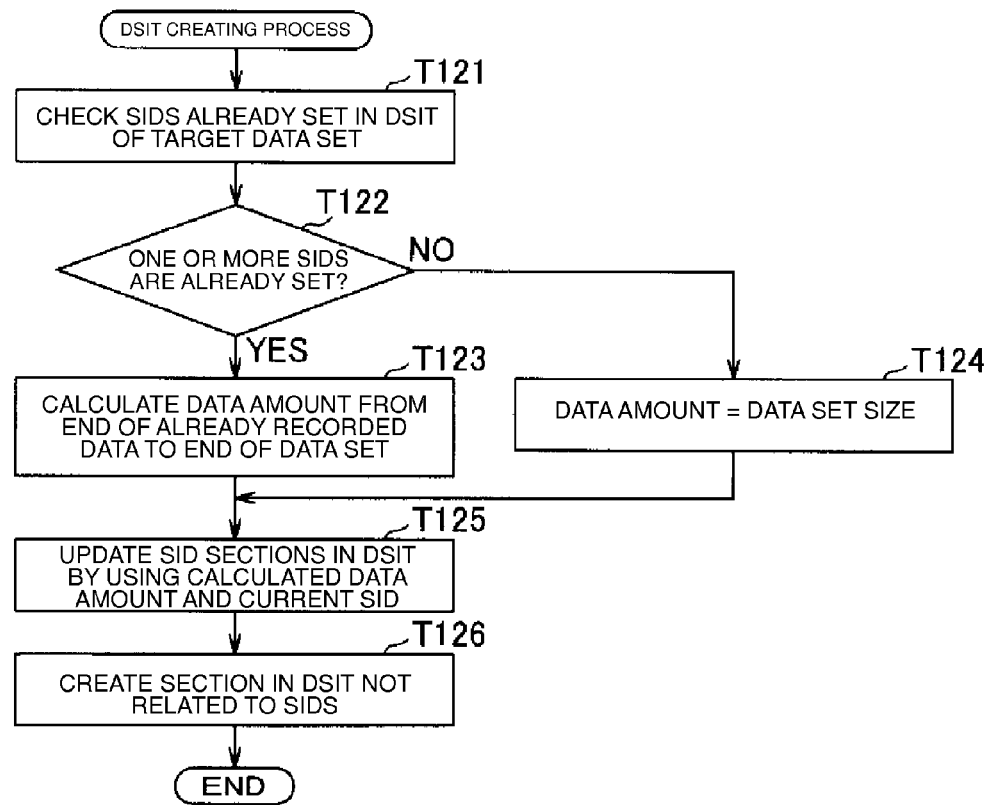
FIG. 11 is a flowchart showing an example of a DSIT creating process according to the present invention, which is executed by the controller in FIG. 1.

In the process in step T113, the controller 16 calls a later-described DSIT creating process shown in FIG. 11. After ending this DSIT creating process, the controller 16 proceeds to a process in step T114. Meanwhile, if incorrect SID data is already stored in the first data set 51 in which the data sent by the Write command is stored, a correct SID can be set by loops of the process in step T113 as described.

In the process in step T114, the controller 16 determines whether or not a DSIT 52 is created for all the data sets 51 in the buffer 12. If determining that a DSIT 52 is not yet created for all the data sets 51 (NO is T114), the controller 16 returns to the process in step T113 and repeats a series of the processes. On the other hand, if determining that a DSIT 52 is created for all the data sets 51 (YES in T114), the controller 16 proceeds to a process in step T115.

In the process in step T115, the controller 16 controls the recording channel 13, the head position control system 17, the motor driver 18, and the like in order to write the data sets 51 and the DSITs 52 in the segments 12b to the tape 14a via the recording channel 13. Thereafter, the controller 16 proceeds to the process in step T116. In the process in step T116, the controller 16 advances the buffer pointer of the buffer 12 to the end of the data written to the buffer 12, and then ends the process.

Next, referring a flowchart in FIG. 11, description will be given below of an example of the DSIT process in FIG. 10 executed by the controller 16 of the above-mentioned tape drive 10.

In a process in step T121, the controller 16 checks SIDs already set in a DSIT 52 associated with the target data set 51, and then proceeds to a process in step T122. In the process in step T122, the controller 16 determines whether or not one or more SIDs, i.e., the SID1 and the SID2 in FIG. 9, are already set in the DSIT 52.

If determining that one or more SIDs are already set (YES in T122), the controller 16 proceeds to a process in step T123. The controller 16 then calculates a data amount from the end of data already recorded in a segment 12b to the end of the newest data set 51 (T123), and thereafter proceeds to a process in step T125.

On the other hand, if determining that one or more SIDs are not set (NO in T122), the controller 16 proceeds to a process in step T124. The controller 16 then sets the value of the data set size as the data amount of the data set 51 (T124), and thereafter proceeds to the process in step T125.

In the process in step T125, the controller 16 sets at least one of the SID1_Length and the SID2_Length in the DSIT 52 by using the calculated data amount. Using the calculated data amount and the current SID described in the memory or the like, the controller 16 updates the SID sections in the DSIT 52, and then proceeds to a process in step T126. In the process in step T126, the controller 16 creates a section in the DSIT 52 that is not related to the SIDs, and then ends the process.

Figure 12:
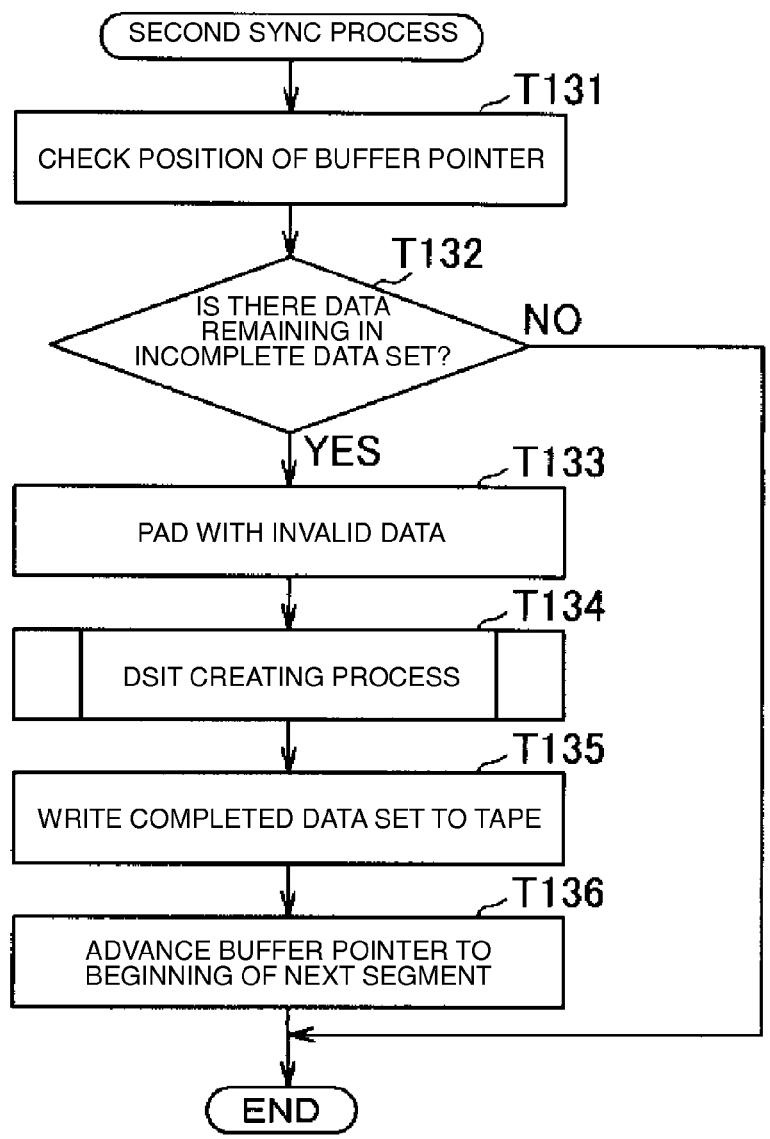
FIG. 12 is a flowchart showing an example of a second Sync process according to the present invention, which is executed by the controller in FIG. 1.

Next, referring to a flowchart shown in FIG. 12, description will be given below of an example of a second Sync process executed by the tape drive 10.

In a process in step T131, the controller 16 checks the position of the buffer pointer of the buffer 12 and then proceeds to a process in step T132. In the process in step T132, the controller 16 determines whether or not there is data remaining in an incomplete data set 51 in the buffer 12. If determining that there is no data remaining in the incomplete data set 51 (NO in T132), the controller 16 ends the process. On the other hand, if determining that there is data remaining in the incomplete data set 51 (YES in T132), the controller 16 proceeds to a process in step T133.

In the process in step T133, the controller 16 uses the aforementioned invalid data 43 to pad a region following the end of the data written to a segment 12b at this time, i.e., a writable region in the segment 12b. Thereafter, the controller 16 proceeds to a process in step T134. The controller 16 then calls the above-described DSIT creating process shown in FIG. 11. After ending the DSIT creating process, the controller 16 proceeds to a process in step T135.

In the process in step T135, the controller 16 controls the recording channel 13, the head position control system 17, the motor driver 18, and the like in order to write the data set 51 and the DSIT 52 in the segment 12b to the tape 14a via the recording channel 13. Thereafter, the controller 16 proceeds to a process in step T136. In the process in step T136, the controller 16 advances the buffer pointer of the buffer 12 to the beginning of the next segment 12b, and then ends the process.

Figure 13:
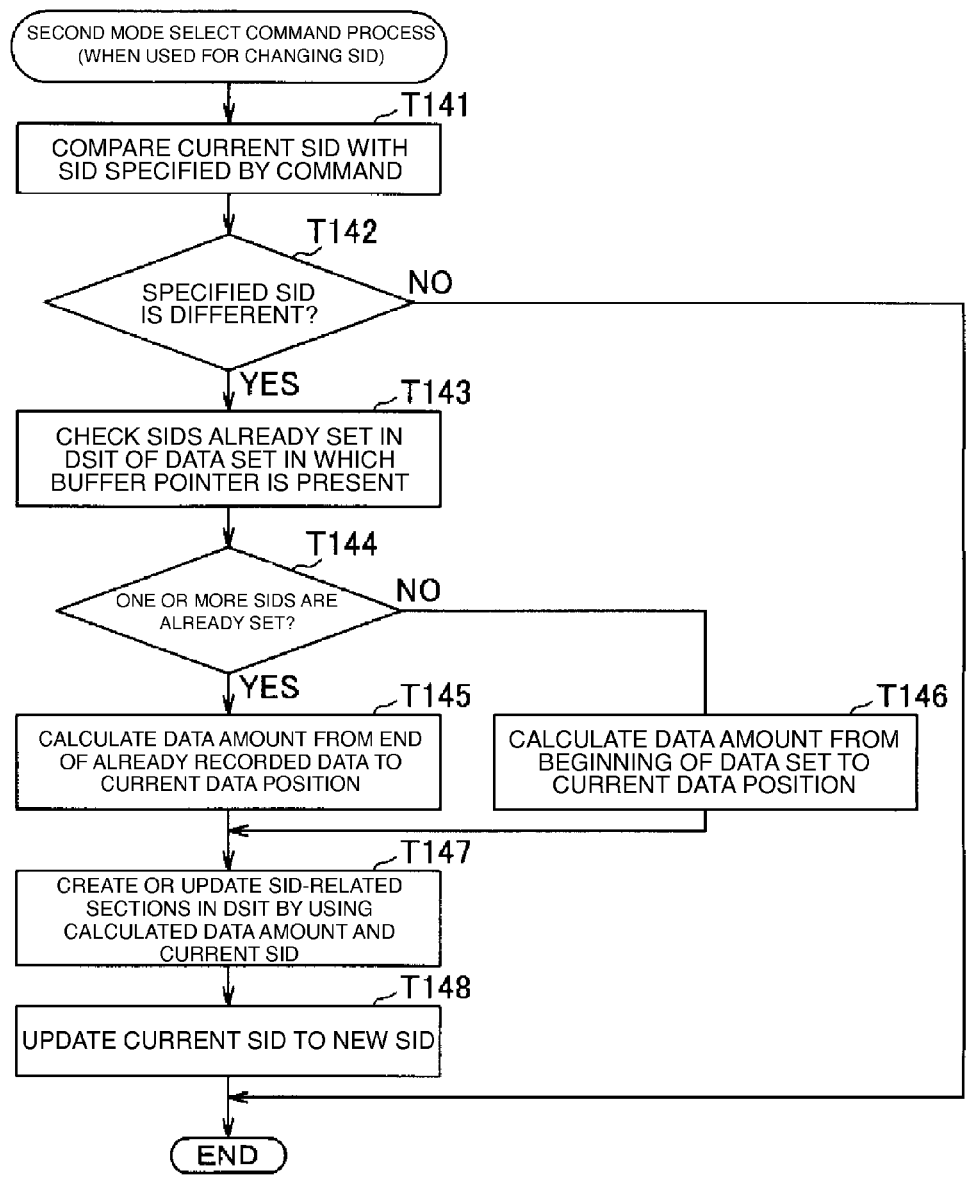
FIG. 13 is a flowchart showing an example of a second Mode Select command process according to the present invention, which is executed by the controller in FIG. 1.

Next, referring to a flowchart shown in FIG. 13, description will be given below of an example of a second Mode Select command process which the controller 16 executes when the tape drive 10 receives a MS command from the host 20.

In a process in step T141, the controller 16 compares the current SID in the memory or the like with a SID specified by the MS command, and then proceeds to a process in step T142. In the process in step T142, the controller 16 determines whether or not the SID specified by the MS command is different from the SID in the memory or the like. If determining that the specified SID is not different, i.e., the SIDs match each other (NO in T142), the controller 16 ends the process since the SID in the memory or the like requires no change. On the other hand, if determining that the SIDs are different from each other (YES in T142), the controller 16 proceeds to a process in step T143.

In the process in step T143, the controller 16 checks SIDs already set in the DSIT 52 of the data set 51 in which the buffer pointer is present, and then proceeds to a process in step T144. In the process in step T144, the controller 16 determines whether or not one or more SIDs, i.e., the SID1 and the SID2 in FIG. 9, are already set in the DSIT 52.

If determining that one or more SIDs are already set (YES in T144), the controller 16 proceeds to a process in step T145. The controller 16 then calculates a data amount from the end of data already recorded in a segment 12b to the end of the newest data set 51 (T145), and thereafter proceeds to a process in step T147.

On the other hand, if determining that one or more SIDs are not set (NO in T144), the controller 16 proceeds to a process in step T146. The controller 16 then calculates a data amount from the beginning of the data set 51 to the current data position (T146), and thereafter proceeds to the process in step T147.

In the process in step T147, the controller 16 uses the calculated data amount and the current SID to create or update sections in the DSIT 52 related to the SIDs, and then proceeds to a process in step T148. In the process in step T148, the controller 16 updates the current SID stored in the memory or the like to the new SID specified by the MS command, and then ends the process.

In a case of accumulating data received from the host 20 together with a Write command into a segment 12b of the buffer 12, the tape drive 10 detects data structures and lengths for the corresponding accumulated data set 51 to thereby create a DSIT 52 thereof. Note that as examples of the detection of the data structures and lengths, various different embodiments are employable such as a method in which the data lengths are detected along with the determination of the data types using the SID stored in the memory or the like of the controller 16 as in the case of the above-mentioned flowchart in FIG. 5, and a method in which the data lengths are detected by receiving the length of any one of data pieces from the host 20 by means of a Write command.

Now assume a case where the tape drive 10 receives a Read command from the host 20. In this case, when data sets 51 and DSITs 52 thereof read from the tape 14a are accumulated in segments 12b, the tape drive 10 refers to the SID1, the SID1_Length, the SID2, and the SID2_Length in the DSITs 52 to determine the structures of the data sets 51. The tape drive 10 then transfers data subsets requested by the Read command to the host 20.

With the DSIT 52 having a configuration as described above, even when the data set 51 is constituted of both main data 41 and sub data 42, the data structures and lengths can be determined based on the DSIT 52. Thus, the host 20 transmits a Write command to the tape drive 10 in such a manner as to separate the main data 41 and the sub data 42 as described in the above-mentioned embodiment. This eliminates the need for storing invalid data 43 into the tape 14a even when there exist a number of sub data 42. Such elimination can contribute to the decreasing of the amount of data to be stored into the tape 14a as well as the increasing of the size of each segment 12b of the buffer 12 and the like.

Meanwhile, the DSIT 52 can include one SID since there exist only two types of data, namely, main data 41 and sub data 42 in this embodiment. For example, the DSIT 52 may include one SID as data allowing distinguishing among: main data pieces 41; sub data pieces 42; only one main data piece 41; only one sub data piece 42; a mixture of a main data piece(s) 41 and a sub data piece(s) 42; and the like. Nonetheless, including the SID1 and the SID2 as shown in FIG. 9 makes it possible to determine the sequence and the like of mixed data pieces. Moreover, increasing the number of data in the DSIT 52 indicating the SIDs and the lengths thereof (e.g., SID3, SID4, ..., and so on) makes it possible to increase the types of data mixed in the data set 51.

Further, an embodiment as below is also possible in the above-mentioned tape medium recording system 1. In a case of data migration by the cartridge 14e or the like where it is unknown, at the time of reading, whether or not sub data 42 is included in the cartridge 14e, the host 20 uses the aforementioned MS command to set a special SID (e.g., 0xFF or the like) to the target. In that case, the tape drive 10 transfers data to the host 20 while checking the SID of the next DSIT 52. Then, when the SID of the next DSIT 52 becomes different from the SID of the DSIT 52 corresponding to the currently transferred data set 51, the tape drive 10 transmits a check condition as sense data to the host 20. By the sense data, the host 20 recognizes a change in the SID. Meanwhile, the tape drive 10 is configured not to transfer a data set 51 whose SID is set to a blank. In this case, no check condition is reported to the host 20.

Moreover, the above-mentioned tape medium recording system 1 may use a Locate/Space command of the LTO standard which is a command to move the head 14b for reading/writing to a position (logical position) of any $N^{th}$ record or file mark 4f from the beginning of the tape 14a. Upon receiving such a Locate/Space command, the above-mentioned tape drive 10 may detect a data position in the tape 14a and move to the head 14b to that position.

Description will be given of a case where the head 14b is moved to the position of a desired record of main data 41 by use of a Locate command, for example. Note that the record is defined as one data set 51 for the sake of simple description. The controller 16 of the above-mentioned tape drive 10 functions as management information reading means, target data determining means, and data detecting means. The host 20 transmits a Locate command specifying a record as the target data to the tape drive 10.

Upon receiving a Locate command from the host 20, the tape drive 10 sets 0 to a counter of the internal memory or the like, and sequentially reads DSITs 52 from the tape 14a by using the management information reading means. The tape drive 10 then determines by using the target data determining means whether or not the SID in the read DSIT 52 indicates "1," i.e., main data 41. If determining by using the target data determining means that the SID indicates main data 41, the tape drive 10 increments the counter of the internal memory or the like. Then, the tape drive 10 determines by using the data detecting means whether or not the value of the counter matches the record specified by the Locate command. If it is determined that they do not match each other, the data set 51 is not the record of the target data and therefore the tape drive 10 performs the determination process on the next DSIT 52. On the other hand, if it is determined that they match each other, the data set 51 is the target data requested by the Locate command and therefore the tape drive 10 moves the head 14b to the beginning of the data set 51 in the tape 14a. Incidentally, the numbers of records can be added to the configuration of the above-mentioned DSITs 52. When the tape drive 10 creates the DSITs 52, the numbers of records may be set thereto, respectively.

Description will be also given of a case where the head 14b of the tape drive 10 is moved to the position of a given file mark 4f by use of a Space command. A file mark count indicating the presence or absence of a file mark as well as its number, data position, and the like is added to the configuration of the above-mentioned DSIT 52. The file mark count is set when the tape drive 10 creates each DSIT 52. The tape drive 10 determines based on the DSIT 52 the data structure of the data set 51, i.e., the presence or absence of a file mark 4f. If determining that a file mark 4f is present, the tape drive 10 detects its data position from the DSIT 52. The tape drive 10 then detects the beginning of the file mark 4f in the data set 51 and moves the head 14b to a position in the tape 14a corresponding to the beginning.

Furthermore, as another embodiment, in the DSIT 52 of the above-mentioned embodiment, a password utilizing a hash value outputted through a hash function or the like can be added to the data structure. For example, in the tape drive 10, the management information adding means 16b acquires, from the host 20, a password corresponding to a data set 51 accumulated in one of the segments 12b. The management information adding means 16b adds a DSIT 52 having the password to the data set 51. With this configuration, a password can be set for each data set 51. Accordingly, each data set 51 can be stored into the tape 14a while being separated into a part that is readable by only those knowing the password and a part that is generally readable.

Also, as another embodiment, in a DSIT 52 corresponding to sub data 42, a version of one file can be added to the data structure. With this structure, multiple versions of one file can be stored collectively into the tape 14a. For example, in the above-mentioned tape drive 10, the management information adding means 16b acquires, from the host 20, file version data corresponding to a data set 51 accumulated in one of the segments 12b. Then, the management information adding means 16b adds a DSIT 52 having the file version data to the data set 51. With this configuration, multiple versions of one file can be stored continuously into the tape 14a.

Note that the present invention described hereinabove may be implemented in whole by hardware or may be implemented in whole by software. Alternatively, the present invention may be implemented by both hardware and software. The present invention may also be implemented as a computer, a data processing system, or a computer program. The computer program can be stored in and provided as a computer-readable medium. Here, the medium is possibly an electronic, magnetic, optical, electromagnetic, infrared, or semiconductor system (apparatus or device), or a transmission medium. As examples of the computer-readable medium, there are illustrated a semiconductor, a solid-state storage device, a magnetic tape, a removable computer diskette, a random access memory (RAM), a read-only memory (ROM), a rigid magnetic disk, and an optical disk. Examples of currently available optical disks include a compact disc read-only memory (CD-ROM), a compact disc read/write (CD-R/W), and a DVD.

As described, the above-mentioned embodiments are merely typical forms of the present invention, and the present invention is not limited to the embodiments. That is, the present invention can be carried out in various modified forms without departing from the gist of the present invention.

The invention claimed is:

1. A data recording apparatus for storing first data and second data into a tape medium, the first data being main data and the second data being sub data related to the first data, the data recording apparatus comprising:
   a plurality of buffer segments in which the first data and the second data are accumulated sequentially in the form of one or more successive data sets in a predetermined size, the first and second data being continuously received as a file from a higher level apparatus;
   determination means that determines whether a data structure of each of the data sets accumulated in the buffer segments includes one or more of the main data and the sub data;
   management information adding means that adds management information to a corresponding one of the data sets, the management information indicating whether the data structure includes one or more of the main data and the sub data determined by the determination means; and
   storing control means that controls storing, into the tape medium, the data sets accumulated in the buffer segments and the management information added to the data sets.

2. The data recording apparatus according to claim 1, wherein the determination means, on the basis of a predetermined request from the higher level apparatus, detects switching of data to be accumulated in one of the buffer segments from the first data to the second data the switching occurring in response to a request from a host in communication with the determination means, and determines the data structure of a corresponding one of the data sets on the basis of a result of the detection.

3. The data recording apparatus according to claim 2, wherein on condition that the determination means detects the switching of the data to be accumulated in the one buffer segment, invalid data is accumulated in an empty space in the buffer segment to thereby complete the corresponding data set.

4. The data recording apparatus according to claim 2, wherein the determination means is means that determines the structure of the corresponding data set as any one of the first data, the second data, and mixed data of the first and second data on the basis of the result of the detection of the switching of the data to be accumulated in the one buffer segment.

5. The data recording apparatus according to claim 1, wherein the management information is a table for managing the data sets.

6. The data recording apparatus according to claim 1, wherein the management information adding means, on condition that any of the data sets includes both the first data and the second data, adds a data size of at least one of the first data and the second data to the management information and adds the management information to the data set.

7. The data recording apparatus according to claim 1, wherein the management information adding means acquires, from the higher level apparatus, file version data corresponding to the data sets accumulated in the buffer segments and adds the management information having the file version data to the data sets.

8. The data recording apparatus according to claim 1, wherein the management information adding means creates password data corresponding to the data sets accumulated in the buffer segments and adds the management information having the password data to the data sets.

9. The data recording apparatus according to claim 1, further comprising a controller that functions as the determination means, the management information adding means, and the storing control means.

10. The data recording apparatus according to claim 1, further comprising a tape drive, wherein the storing control means is incorporated into the tape drive.

* * * * *